(12) United States Patent
Hoskins et al.

(10) Patent No.: US 9,834,137 B2
(45) Date of Patent: Dec. 5, 2017

(54) TURN SIGNAL SYSTEMS AND METHODS

(71) Applicant: Kostal of America, Troy, MI (US)

(72) Inventors: Steven R. Hoskins, Walled Lake, MI (US); Michael F. Tefend, Lake Orion, MI (US)

(73) Assignee: Kostal of America, Troy, MI (US)

( * ) Notice: Subject to any disclaimer, the term of this patent is extended or adjusted under 35 U.S.C. 154(b) by 0 days.

(21) Appl. No.: 15/183,327

(22) Filed: Jun. 15, 2016

(65) Prior Publication Data

US 2016/0288701 A1 Oct. 6, 2016

Related U.S. Application Data

(62) Division of application No. 14/336,660, filed on Jul. 21, 2014, now Pat. No. 9,393,901.

(51) Int. Cl.
| | |
|---|---|
| *B60Q 9/00* | (2006.01) |
| *G08B 6/00* | (2006.01) |
| *B60Q 1/40* | (2006.01) |
| *B60Q 1/34* | (2006.01) |
| *G08G 1/16* | (2006.01) |

(52) U.S. Cl.
CPC .............. *B60Q 1/40* (2013.01); *B60Q 1/343* (2013.01); *B60Q 9/00* (2013.01); *G08B 6/00* (2013.01); *G08G 1/166* (2013.01)

(58) Field of Classification Search
CPC ........ B60Q 1/425; B60Q 1/40; B60Q 1/1469; B60Q 9/008; G05G 5/03; H01H 2003/008; H01H 2215/05; H01H 25/04; H01H 3/503
See application file for complete search history.

(56) References Cited

U.S. PATENT DOCUMENTS

| | | | |
|---|---|---|---|
| 3,914,566 A | 10/1975 | Wendling | |
| 4,503,296 A * | 3/1985 | Iwata | B60Q 1/425 200/288 |
| 4,652,805 A * | 3/1987 | Kohn | G05B 19/408 318/628 |
| 4,840,078 A * | 6/1989 | Shitanoki | B60R 16/027 74/484 R |
| 5,054,941 A * | 10/1991 | Koike | B41J 2/30 101/93.05 |
| 5,260,685 A * | 11/1993 | Parker | B60Q 1/40 340/476 |
| 5,575,177 A | 11/1996 | Poleschuk et al. | |
| 5,668,539 A * | 9/1997 | Patchell | B60Q 1/52 250/349 |
| 5,773,776 A | 6/1998 | Uleski et al. | |
| 6,091,321 A * | 7/2000 | Karell | B60Q 1/34 340/425.5 |
| 6,237,437 B1 | 5/2001 | Takahashi | |
| 6,300,852 B1 * | 10/2001 | Kato | B60Q 1/1469 200/327 |

(Continued)

*Primary Examiner* — Fekadeselassie Girma
(74) *Attorney, Agent, or Firm* — Butzel Long

(57) ABSTRACT

Methods and systems are provided pertaining to a turn signal. AUTO CANCEL of a turn signal may be performed electrically, eliminating cancelling pawls and undesirable noise emanating from such pawls as they click against conventional structure in predominantly mechanical turn signal systems. An electromagnetic brake may dampen or prevent turn signal stalk movement if an object is in a blind spot of a vehicle. Such brake may be released or canceled electronically and quietly.

8 Claims, 4 Drawing Sheets

(56) References Cited

U.S. PATENT DOCUMENTS

| | | | | |
|---|---|---|---|---|
| 6,404,354 B1* | 6/2002 | Decker | G05G 1/08 | 200/318 |
| 6,414,593 B1* | 7/2002 | Conner | B60Q 1/40 | 200/61.45 R |
| 6,445,288 B1* | 9/2002 | Pittman | B60Q 1/40 | 340/465 |
| 6,660,951 B2 | 12/2003 | Uchiyama | | |
| 7,432,800 B2* | 10/2008 | Harter, Jr. | B60Q 9/008 | 340/435 |
| 9,649,964 B2* | 5/2017 | Imajo | B60N 2/68 | |
| 2002/0005778 A1* | 1/2002 | Breed | B60Q 9/008 | 340/435 |
| 2002/0056629 A1* | 5/2002 | Sano | B60Q 1/425 | 200/327 |
| 2002/0139600 A1* | 10/2002 | Nakatani | B60K 17/105 | 180/291 |
| 2003/0222844 A1* | 12/2003 | Wang | G06F 3/03543 | 345/156 |
| 2004/0090318 A1* | 5/2004 | Rothkop | B60Q 9/008 | 340/435 |
| 2004/0100373 A1* | 5/2004 | Ponziani | B60Q 1/346 | 340/476 |
| 2004/0206611 A1* | 10/2004 | Kobayashi | B60Q 1/1469 | 200/10 |
| 2005/0046141 A1* | 3/2005 | Gogo | B62K 21/08 | 280/271 |
| 2005/0195383 A1* | 9/2005 | Breed | B60N 2/002 | 356/4.01 |
| 2006/0185463 A1* | 8/2006 | Takahashi | B60Q 1/1469 | 74/504 |
| 2008/0119993 A1* | 5/2008 | Breed | B60R 19/205 | 701/46 |
| 2009/0027186 A1* | 1/2009 | DeWitt, III | B60Q 1/425 | 340/476 |
| 2012/0019375 A1* | 1/2012 | Kataoka | B60W 50/14 | 340/439 |
| 2013/0175132 A1* | 7/2013 | Battlogg | F16D 37/02 | 192/21.5 |
| 2013/0184900 A1* | 7/2013 | Constans | B64C 19/00 | 701/3 |
| 2013/0190949 A1* | 7/2013 | Constans | B64D 31/02 | 701/3 |
| 2014/0071278 A1* | 3/2014 | Assaf | B60R 1/12 | 348/148 |
| 2014/0100770 A1* | 4/2014 | Chiang | B60Q 9/008 | 701/301 |
| 2014/0311314 A1* | 10/2014 | Rawson | G10C 3/161 | 84/242 |
| 2016/0153508 A1* | 6/2016 | Battlogg | A61F 2/38 | 74/553 |
| 2016/0379777 A1* | 12/2016 | Nabe | B60K 37/06 | 335/205 |
| 2017/0115735 A1* | 4/2017 | Battlogg | G06F 3/016 | |

* cited by examiner

TURN SIGNAL SYSTEMS AND METHODS

CROSS-REFERENCE TO RELATED APPLICATION

This divisional patent application claims priority to U.S. non-provisional patent application Ser. No. 14/336,660 filed on Jul. 21, 2014.

TECHNICAL FIELD

The present disclosure relates to turn signals in vehicles, including but not limited to automotive vehicles.

BACKGROUND

Turn signal systems have been in vehicles for decades. Certain varieties of conventional turn signal systems and cancelling structures and methods for same are disclosed in, for example, U.S. Pat. Nos. 3,914,566; 5,260,685; 5,575,177; 5,773,776; 6,237,437 and 6,660,951, each of which is incorporated by reference in its entirety.

Many conventional turn signal systems use cancellation pawls, which click and cause noises that some operators may find to be objectionable. For example, there may be an audible tick of a cancel pawl bypass when a steering wheel is rotated in the direction indicated by the turn signal stalk (sometimes referred to as a lever). There may be a mechanical sounding click when the turn signal AUTO CANCELs, after for example, a turn has been completed. There may also be mechanical audible feedback during a mechanical override when a driver (sometimes referred to as an operator) causes a steering wheel to turn in the direction not indicated by the turn signal stalk. It may be desirable to eliminate some or all of such audibly detectable noises in the cabin of a vehicle.

Additionally, conventional turn signal systems may not be adapted to be responsive to the environment. For example, if an object (such as a target vehicle) is in a blind spot of the vehicle, conventional turn signal systems may nevertheless permit a driver to indicate a turn in a direction that would likely cause a collision with the object. It may be desirable to implement systems where such an object would be sensed, and an electronically controlled device could be used to damp or prevent movement of a turn signal stalk. In other words, it may be desirable to provide tactile feedback to a driver attempting to turn into a hazard to provide a warning that such a turn may be ill-advised.

Features and advantages of the present disclosure will become readily appreciated as the same becomes better understood after reading the following description when considered in conjunction with the accompanying drawings.

DETAILED DESCRIPTION

Figure 1:
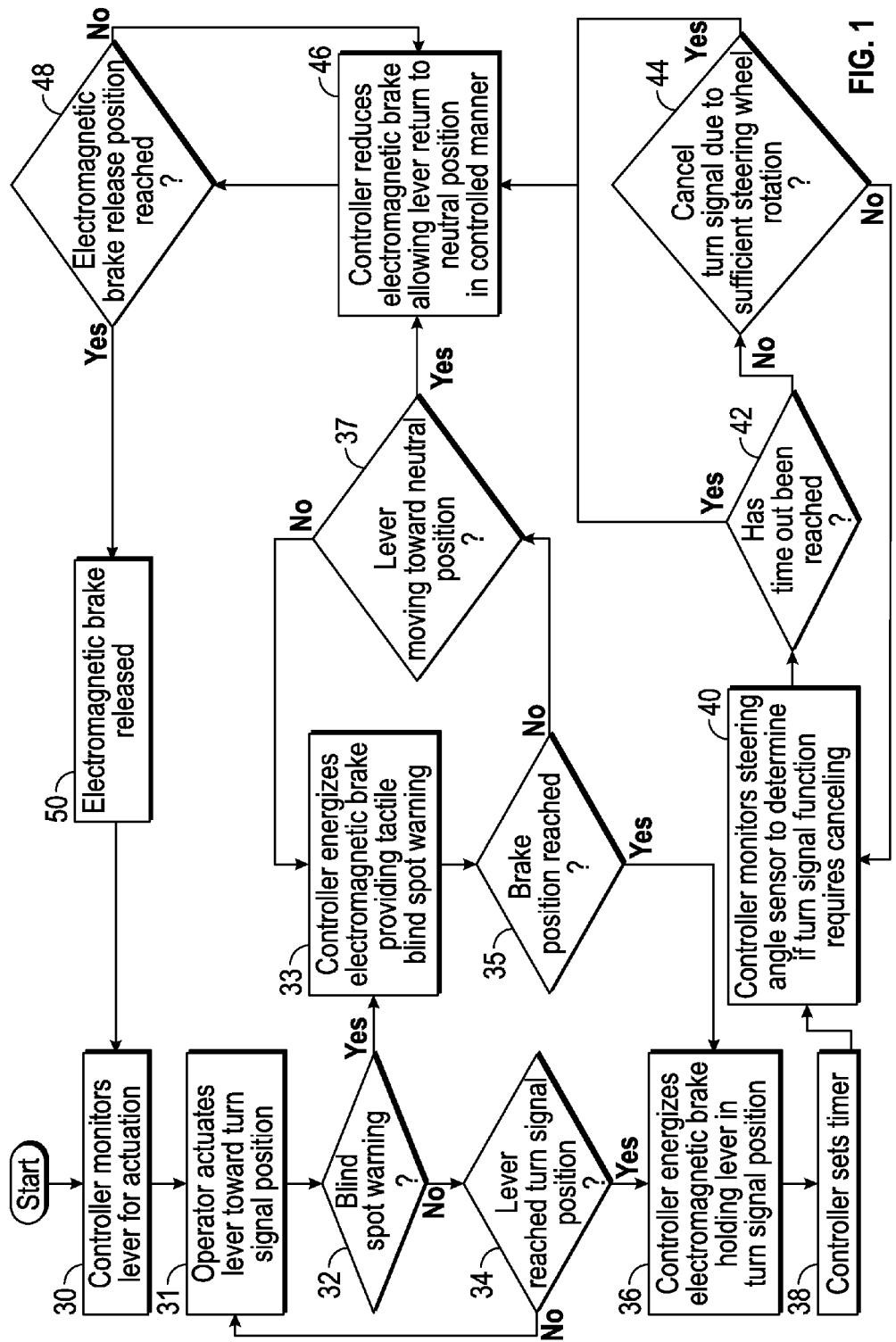
FIG. 1 is an flow chart of a series of exemplary methods, any one or more of which may be used in connection with turn signal systems.

Referring to the following description and drawings, exemplary approaches to the disclosed systems are detailed.

Although the drawings represent some possible approaches, the drawings are not necessarily to scale and certain features may be exaggerated, removed, or partially sectioned to better illustrate and explain the disclosed devices. Further, the description below is not intended to be exhaustive, nor is it to limit the claims to the precise forms and configurations described and/or shown in the drawings.

Referring to FIG. 1, exemplary methods are shown in combination for use in connection with a turn signal system. Initially, in box 30, a controller is configured to monitor whether a turn signal has been actuated. One way of doing this is to use equipment such as one or more sensors to communicate to a controller whether the lever or turn signal stalk has changed position. Box 31 assumes movement has been sensed—that a driver has actuated the turn signal stalk and that a directly or indirectly resultant signal was sent to a controller to so indicate.

Many vehicles, including automotive vehicles, are equipped with various sensing systems and related controllers to determine whether a potential object is in a blind spot. Such systems are sometimes referred to as crash avoidance systems. Other terminology may be used to describe crash avoidance systems; the phrase "crash avoidance systems" is meant to be general and to encompass collision prevention systems, and other like phraseology.

Starting at decision box 32, a controller is configured to evaluate whether a sensor, series of sensors or a crash avoidance system has detected an object such as a target vehicle in a blind spot of a host vehicle. Such blind spot data or information may be sent to the controller directly from a sensor or indirectly through the vehicle bus. If there is no object in a blind spot, the controller operates in a business-as-usual manner, generally permitting the driver or operator to move the turn signal stalk to the position desired without tactile feedback. At decision box 34, it is determined whether the turn signal stalk or lever has reached its intended turn signal position. If it has not, the operator or driver keeps moving the lever until it arrives in position. If it has, then the flow moves to box 36, where the controller directly or indirectly energizes a tactile feedback device such as an electromagnetic brake to hold the turn signal stalk or lever in position.

Returning to decision box 32, if an object is in a blind spot of the host vehicle, the decision flow reaches box 33. A controller having received data that an object is in a blind spot causes a signal to be sent, directly or indirectly, to a tactile feedback device such as an electromagnetic brake in communication with a turn signal stalk. The electromagnetic brake may provide tactile feedback according to predetermined configurations. That is, the predetermined tactile feedback may be an absolute bar to movement—a prevention of movement—of the turn signal stalk in one embodiment. In another embodiment, the predetermined tactile feedback may provide a ratcheting effect of increasing resistance to move the turn signal stalk. This tactile feedback may warn the driver, optionally along with other feedback (visual and/or auditory) from a crash avoidance system, against moving into a position where the vehicle may crash with the object that is (or was, depending upon temporal conditions) hidden in a blind spot.

At decision box 35, it is determined whether the energized tactile feedback device or electromagnetic brake has reached the intended position. If it has, the flow moves to box 36. The flow also moves to box 36 if there was no object detected in the blind spot, and the turn signal stalk reached its intended position.

In box 36, a controller causes the tactile feedback device to be energized hold the lever or turn signal stalk in the intended position. Then, in box 38, the controller causes a timer to be set. In box 40, a controller receives input directly or indirectly from a steering angle sensor to evaluate whether the turn signal function requires cancelling through an AUTO CANCEL function.

At decision box 42, one of the predetermined criteria that can be met to initiate cancellation is whether the timer of box 38 has reached a time out condition. Another of the predetermined criteria that can be met to determine whether cancellation can be initiated is whether the turn has been completed based upon the data received, directly or indirectly, from a steering angle sensor. In other words, it is considered whether the turning action has been completed in decision box 44. It is contemplated that the ordering of decision box 42 and 44 may be altered, or that one decision box may be omitted from the general flow. As depicted, if neither condition is met, the flow returns to box 40 until a condition exists requiring cancellation through AUTO CANCEL.

When the answer to one or the other of decision box 42 or 44 is yes, the flow moves to box 46. At box 46, a controller sends, directly or indirectly, a signal to the tactile feedback device exemplified as an electromagnetic brake to reduce the forces applied by such brake and to allow the lever or turn signal stalk to return to a NEUTRAL position in a predetermined manner such as in a controlled manner or a snap-back manner if desired. Another way to arrive at box 46 is the situation where an object is detected in the blind spot in box 32, a controller causes a brake to be energized in box 33, but the desired brake position is not reached. Then, it is evaluated whether the lever or turn signal stalk at decision box 37 moves toward NEUTRAL position. This direction of movement may happen as a result of the driver or operator responding to the warning and releasing the turn signal lever or stalk. If the turn signal lever or stalk is moving toward a NEUTRAL position, then the flow arrives at box 46.

Box 46 leads the flow to decision box 48, where it is determined whether the electromagnetic brake release position has been reached. If so, the controller the electromagnetic brake is released in box 50. The cycle may begin over upon actuation of the turn signal stalk or lever. If not, the controller continues causing a reduction of the brake force until the condition is met, and the brake is ultimately so the cycle may begin over upon actuation of the turn signal talk or lever.

Figure 2:
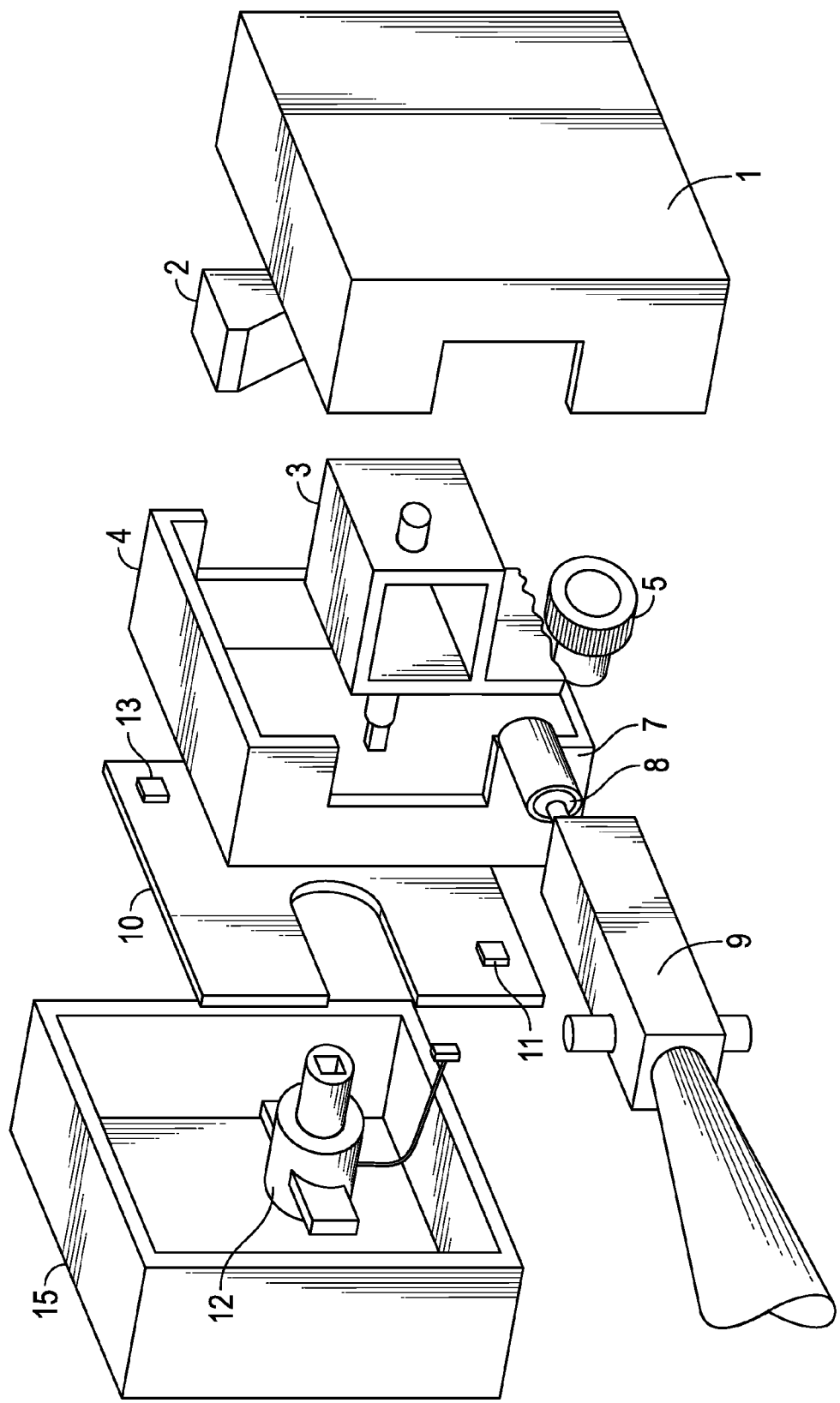
FIG. 2 is an exploded view of an exemplary turn signal system.
Figure 3:
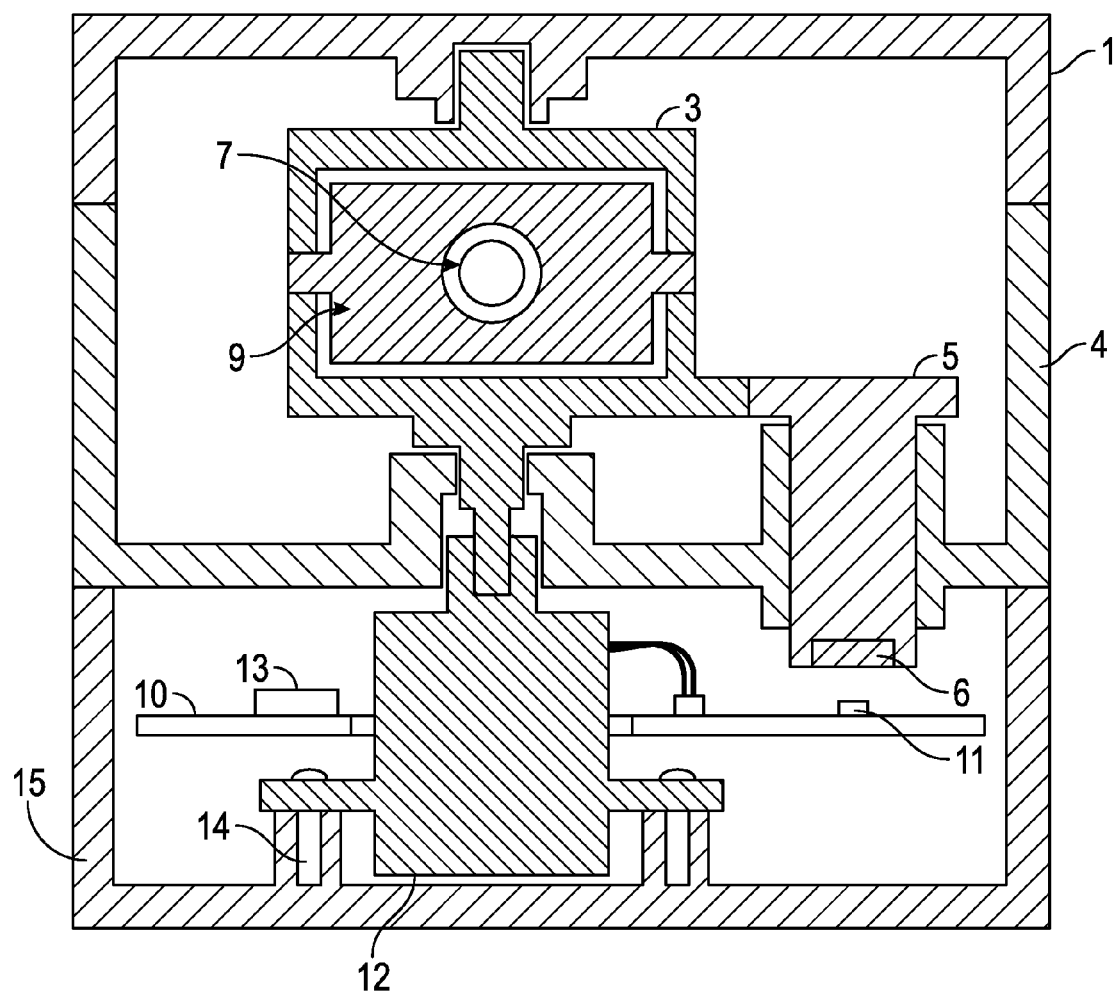
FIG. 3 is a broken away side view of an exemplary turn signal system.

Referring to FIGS. 2 and 3, an exemplary turn signal system is shown that eliminates the need for pawls in AUTO CANCEL mode. Although an electromagnetic brake is exemplified, other electromechanical tactile feedback systems are contemplated that can be driven electronically to apply tactile force to a turn signal stalk or lever. In the depicted example, the turn signal system resides in or in affiliation with a base 15, housing 4 and cover 1. Such components may be plastic, metal, a combination of both, and may be combined in (integrally formed as) one part or made from connectable and separate parts.

A controller 13 may be equipped with electronics (hardware and software) to be in communication with a vehicle bus. Controller 13 may optionally include computer readable storage media for storing data representing instructions executable by a computer or microprocessor. Computer readable storage media may include one or more of random access memory as well as various non-volatile memory such as read-only memory or keep-alive memory. Computer readable storage media may communicate with a microprocessor and input/output circuitry via a standard control/ address bus. As would be appreciated by one of ordinary skill in the art, computer readable storage media may include various types of physical devices for temporary and/or persistent storage of data. Exemplary physical devices include but are not limited to DRAM, PROMS, EPROMS, EEPROMS, and flash memory.

Controller or controllers 13 are configured to monitor the stalk or lever 9 position. In one embodiment, data pertaining to the stalk 9 position is gathered through a gear interface between rotor 3 and magnet 6 located within measurement gear 5, which is positioned above a hall effect cell 11. Hall effect cell 11 and controller 13 are in electrical communication with one another and may be on the same printed circuit board (PCB) 10.

If a crash avoidance system or a external blind spot detection system or module (communicating through a vehicle bus, for example), detects an object such as a target vehicle in a blind spot, then various systems and methods may be invoked if an operator attempts to signal a turn that may cause a crash into the target vehicle. For example, controller 13 may cause a brake such as an electromagnetic brake 12 to be energized to provide tactile feedback to the operator that such turn is ill-advised. The tactile feedback may be an absolute prevention of movement, a damping of movement, or a ratcheting effect of increased resistance when an attempt to make an ill-advised turn is signaled.

In the depicted embodiment, electromagnetic brake 12 is fastened to base 15 using screws 14. Other fastening mechanisms or adhesives may be used.

If an operator releases the stalk 9 while a blind spot warning is active, spring 8 and plunger 7 may ride along a detent profile 2. This may move the stalk 9 toward the turn signal NEUTRAL position. Controller 13 is configured to monitor the stalk 9 position. While the stalk 9 moves toward the NEUTRAL position, controller 13 may reduce power to the electromagnetic brake 12 to permit the stalk 9 to continue moving toward the NEUTRAL position in a controlled manner. That is, once the stalk 9 and the rotor 3 reach the release electromagnetic brake position, the controller 13 may completely release the electromagnetic brake and the controller 13 returns to monitoring for turn signal actuation. Controlled gradual motion is an exemplary controlled manner, both other motions are contemplated. Variations of a snap back action into NEUTRAL can also programmed.

If no object or vehicle is detected, and an operator actuates a stalk 9 to indicate turn, controller 13 is configured to monitor the stalk 9 position. Once the stalk 9 reaches the desired position to indicate a turn, controller 13 will cause the electromagnetic brake to be energized to hold the stalk 9, rotor 3, measurement gear 5 and magnet 6 in the indicated turn signal position.

Controller 13 may cause a timer to be set after the above-named components are held in position. That is time may be a predetermined condition for AUTO CANCEL action. Another such predetermined condition may include steering wheel position. This may be determined by data provided through a steering angle sensor. In the depicted embodiment, if a certain predetermined amount of time has passed OR the steering wheel has moved a certain predetermined number of degrees in the indicated direction, the controller 13 may cause the electromagnetic brake to reduce the braking force, allowing spring 8 and plunger 7 to ride along the detent profile 2 to move the stalk 9 toward NEUTRAL in a controlled manner. Then, once the stalk 9 and rotor 3 reach the release electromagnetic brake position, the controller 13 causes the electromagnetic brake to be released and the controller 13 is again monitoring for operator actuation activity.

Generally, the device of FIGS. 2 and 3 is a turn signal device, comprising an electromagnetic brake in electrical communication with a controller and a turn signal stalk. The controller is configured to electronically damp stalk movement during AUTO CANCEL operations. With this electronic control, it may be possible to reduce or eliminate cancelling pawls from the mechanical turn signal devices that have sometimes been identified as causing undesirable audible effects.

Figure 4:
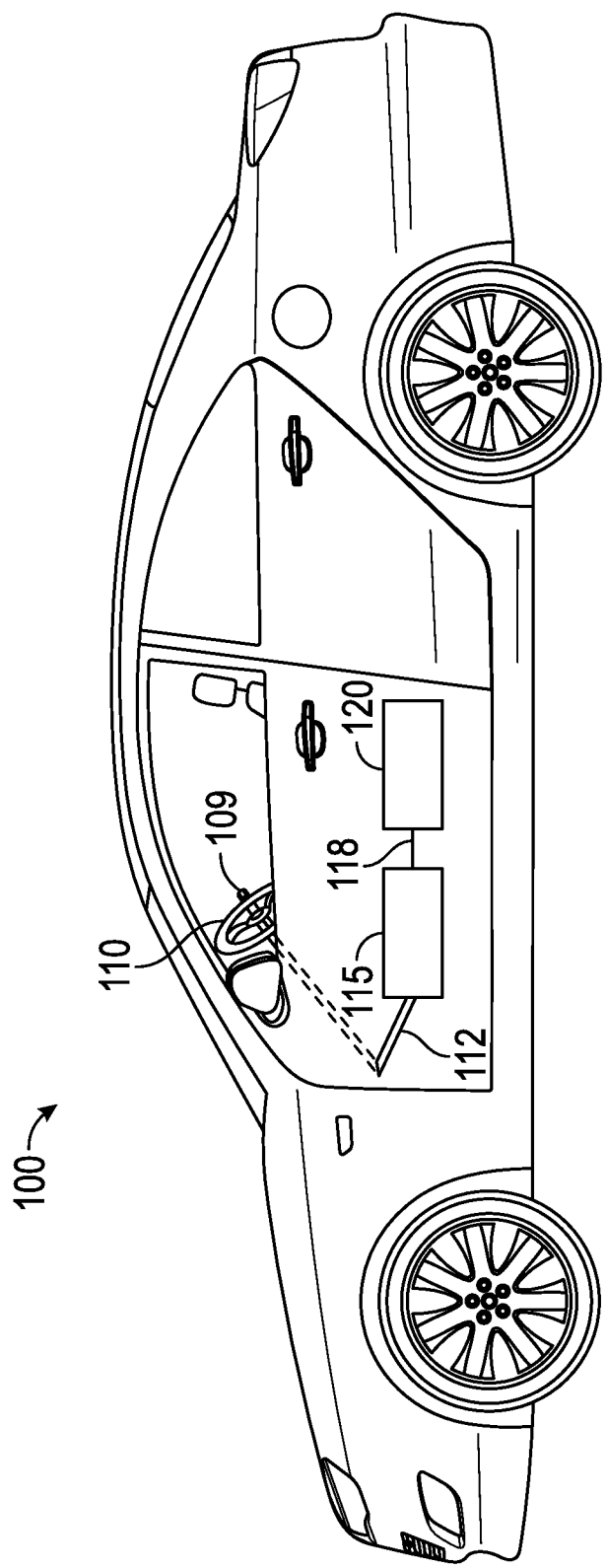
FIG. 4 is a schematic of a crash avoidance system in communication with an exemplary turn signal system in a host vehicle.

Referring to FIG. 4, a general schematic is shown where a host vehicle 100 is equipped with a turn signal system 115 and crash avoidance system 120. Systems 115 and 120 are in communication with one another through a vehicle bus having at least one wire 118. Both systems 115 and 120 are in electrical communication with a turn signal stalk 109 (which is technically part of system 115) through a vehicle bus having at least one wire 112. One or both of systems 115 and 120 may be in communication with a steering wheel system that includes steering wheel 110 and associated steering angle sensors and related controllers. It is contemplated that controllers need not be separate physical parts. The term controller can refer to one or more physical parts, and a single controller can be affiliated with one or more systems; each system does not necessarily have to have a separate controller. This is one reason why communication between systems can be either direct or indirect.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practices other than as specifically described.

What is claimed as new and desired to be protected by Letters Patent of the United States is:

1. A method for controlling a turn signal stalk, comprising:
   determining with a controller whether a turn signal stalk is being activated toward a turn signal position;
   determining whether an object is in a blind spot by sensing signals sent from one or more sensors directly or indirectly to the controller;
   determining whether a warning signal is required to be supplied directly or indirectly by the controller to the turn signal stalk;
   determining whether the turn signal lever has reached a turn signal position for a turn signal function;
   setting a timer for a predetermined period of time;
   monitoring a steering wheel rotation signal sensor to determine whether the turn signal function requires cancelling; determining whether the predetermined period of time has elapsed; and
   reducing an electromagnetic brake by the controller, thereby allowing the turn signal stalk to return to a neutral position in a controlled manner.

2. The method of claim 1, wherein said warning signal is generated in response to one or more predetermined conditions within said predetermined period of time.

3. The method of claim 1, wherein the controller energizes said electronic brake and generates said warning when an object is detected in said blind spot.

4. The method of claim 1, wherein detecting whether an object is in the blind spot comprising detecting a signal sent from a crash avoidance system through a vehicle bus.

5. The method of claim 1, wherein said warning is a tactile warning generated with said electromagnetic brake.

6. The method of claim 1, wherein said warning is a tactile warning preventing movement of the turn signal lever.

7. The method of claim 1, wherein said warning is a tactile warning of ratcheting resistance to movement of said turn signal lever.

8. The method of claim 1, wherein said turn signal function is cancelled based upon degrees of rotation of said steering wheel.

* * * * *